March 31, 1964   J. LECLABART   3,126,895
HEATER GRIP FOR PERMANENT WAVING
Filed April 17, 1961
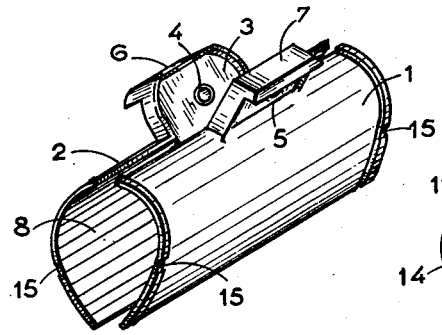
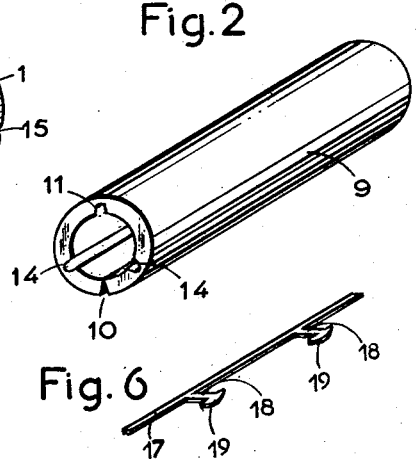
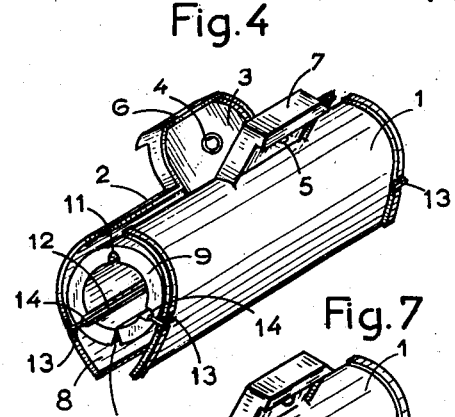
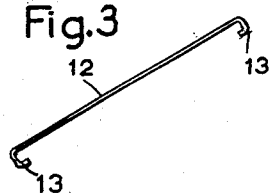
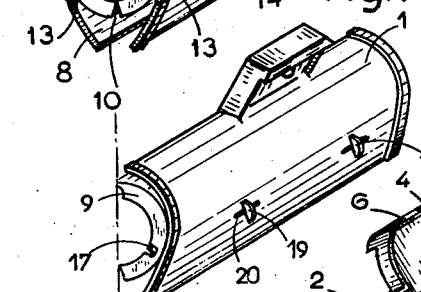
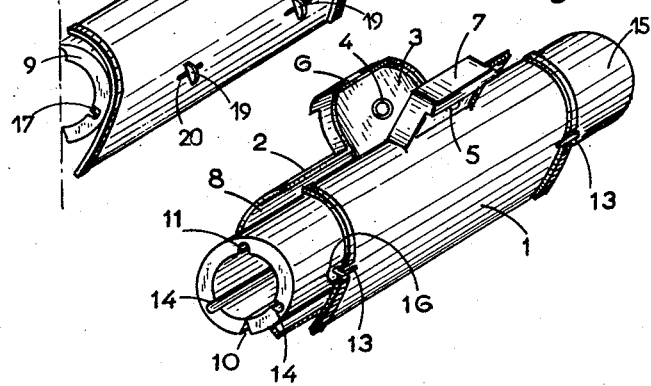

United States Patent Office 3,126,895
Patented Mar. 31, 1964

3,126,895
HEATER GRIP FOR PERMANENT WAVING
Jean Leclabart, 53 Ave. Raymond Poincare,
Paris, France
Filed Apr. 17, 1961, Ser. No. 103,319
Claims priority, application France Apr. 20, 1960
1 Claim. (Cl. 132—36)

The invention relates to a heater grip for permanent waving.

Grips which are heated on heater bars before being placed on the curlers are used at present.

These pieces often comprise parts made of plastic material which exhibits the disadvantage of hardening under the action of heat.

However, it is not desirable to replace the plastic material by heat-resistant metal parts, because of the risk of users being burnt.

The invention enables the closure of the heater sleeves to retain all its flexibility and elasticity, without any risk of users being burnt, and without the sleeve having to be completely replaced in consequence of fatigue of the plastic parts due to heat.

According to the invention, the heater grip comprises on the one hand two half-shells bounding between them a tubular space, the said two half-shells being linked by a device which forms a hinge and enables the said tubular space to be opened, and on the other hand a sleeve made of a material capable of storing heat, the said sleeve taking the form of a tube slit along a generatrix, detachable fixing members being provided to fix the sleeve in the half-shells, the slit in the tube being disposed in the half-shells on the side opposite to the device forming the hinge.

Constructing the grip in this way allows of very easy replacement of that part of the grip which ages under the action of heat, the said part being made of a cheap material, for example rubber, and being obtainable by simply cutting up profiled pieces.

The invention will now be described in greater detail, with reference to some forms of embodiment which are given by way of example and illustrated in the drawings:

FIGURE 1 is a diagrammatic perspective illustration of the two half-shells linked by an elastic metal hinge;

FIGURE 2 is a perspective illustration of a rubber sleeve cut out of a profiled piece of rubber, and capable of being fixed in detachable fashion in the half-shells;

FIGURE 3 illustrates a clip forming part of the grip;

FIGURE 4 illustrates the grip complete with its rubber sleeve; and

FIGURE 5 illustrates a grip in which the sleeve is longer than the two half-shells;

FIGURE 6 is a variation of embodiment of the clip shown in FIGURE 3;

FIGURE 7 is a view analogous to that of FIGURE 4 showing attachment of the sleeve by the clip shown in FIGURE 6.

FIGURES 1 to 4 show the construction of a heater grip according to the invention. It comprises two half-shells 1 and 2 linked by a spring 3 in the form of a V-shaped concave strip whereof the arms are fixed by rivets 4 and 5 to lugs 6 and 7 on the half-shells.

If pressure is applied to the lugs so as to tend to bring them together, a new shape is imparted to the V formed by the spring 3, and the tubular space 8 bounded by the half-shells is opened.

The sleeve 9 is illustrated in FIGURE 2. It may simply take the form of part of a profiled piece of rubber. The said profiled piece is slit at 10, so that the sleeve can open in order to cover either a heater bar or a curler.

The sleeve comprises an internal groove 11 to facilitate opening it, situated opposite to the slit 10.

The sleeve is fixed inside the half-shells by clips 12 in the form of metal rods terminating in hooks 13. The rods 12 are placed in grooves 14 in the internal wall of the sleeve 9. The hooks 13 pass round the corresponding end of the sleeve, and engage in small notches 15 in the edges of the half-shells.

The clips 12 thus fix the sleeve 9 in the half-shells without the risk of unintentional heating by contact with the heater bar. The clips 12 are in fact accommodated at the base of the grooves 14, and have no contact with the heater bar.

The sleeve 9 may be instantly replaced when it has aged under the action of heat. This replacement involves a minimum of expense, since the user himself can cut out the piece to be changed from a cheap profiled piece.

FIGURE 5 illustrates a variant of embodiment in which a sleeve 15 longer than the sleeve 9 has been introduced between the half-shells. In this case, fixing is still carried out by the clips 12, but the hooks 13 must pass through the base of the grooves 14 via orifices 16 in order to engage with the corresponding edges of the half-shells.

FIGURES 6 and 7 show yet another embodiment in which the rubber sleeve is secured in the half-shells by clips formed by slides 17 furnished with lugs 18 having flat heads 19.

The slides 17 are located in the grooves 14 and the lugs 18 pass through the sleeve and the half-shells so that the flat heads 19 extend to the outside to lie beyond slits 20 in the half-shells.

When the heads 19 have been passed through the heads 20 they are turned so as to be perpendicular to the slits in which position they hold the slides 17 in place (FIGURE 7).

The invention is naturally not limited by the details of the forms of embodiment which have just been described, which details may be modified without departing from the scope of the invention.

I claim:

A heater grip for permanent waving comprising two half-shells of heat insulating material forming a tubular space, a hinge connecting said two half-shells for opening said tubular space, a tubular sleeve of heat storing material, said sleeve being slit along a generatrix, longitudinal grooves in the internal wall of said sleeve, detachable securing metal rod members mounted in said grooves and engaging said half-shells securing said sleeve within and to said half-shells, the slit in said sleeve being located away from and opposite said hinge and an internal groove in said sleeve adjacent said hinge.

References Cited in the file of this patent

UNITED STATES PATENTS

| | | |
|---|---|---|
| 1,859,366 | Keele | May 24, 1932 |
| 2,630,809 | Lewis et al. | Mar. 10, 1953 |
| 2,657,694 | Reed et al. | Nov. 3, 1953 |

FOREIGN PATENTS

| | | |
|---|---|---|
| 922,271 | France | Jan. 27, 1947 |
| 701,380 | Great Britain | Dec. 23, 1953 |
| 880,791 | Germany | June 25, 1953 |
| 917,807 | Germany | Sept. 13, 1954 |
| 719,616 | Great Britain | Dec. 8, 1954 |